Feb. 15, 1949.                    M. R. WILEY                          2,461,669
                    VARIABLE INCIDENCE WING CONTROL FOR AIRCRAFT
Filed July 11, 1944                                          3 Sheets-Sheet 1
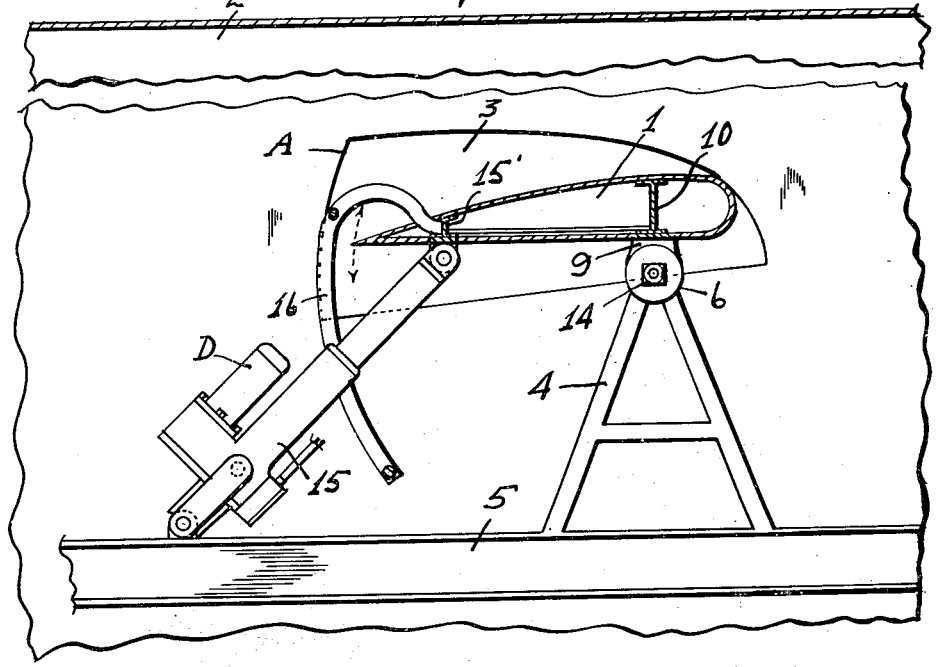
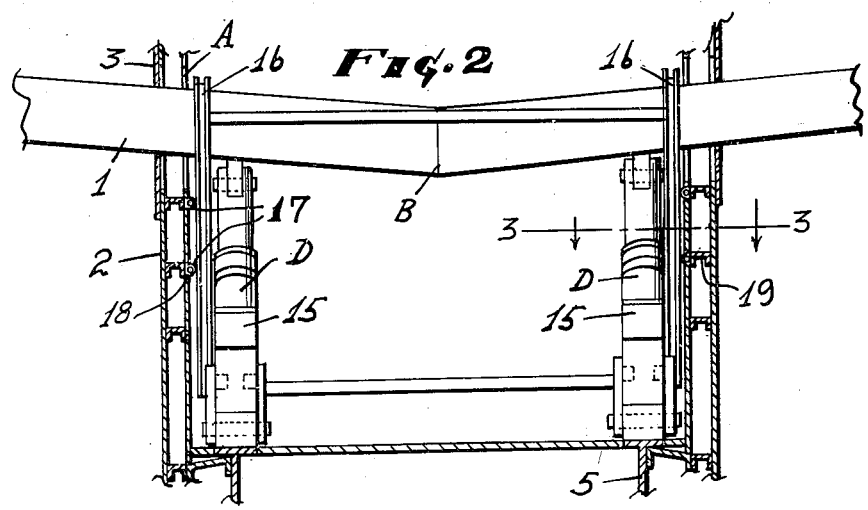
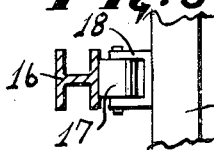 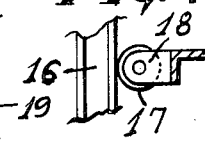 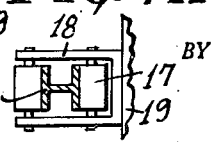
INVENTOR.
M. R. WILEY.

Feb. 15, 1949.  M. R. WILEY  2,461,669
VARIABLE INCIDENCE WING CONTROL FOR AIRCRAFT
Filed July 11, 1944  3 Sheets-Sheet 2
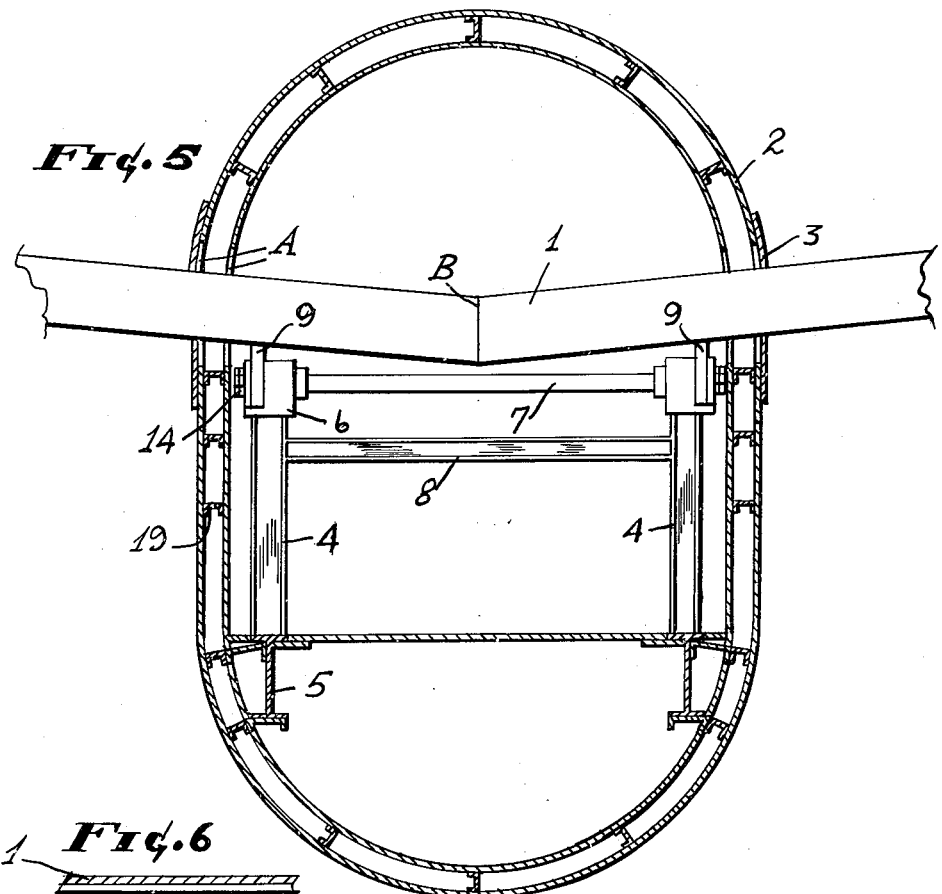
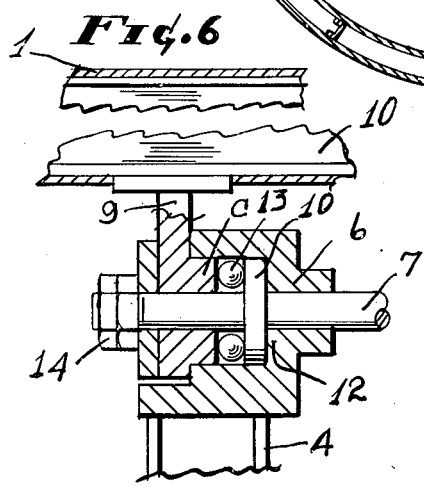
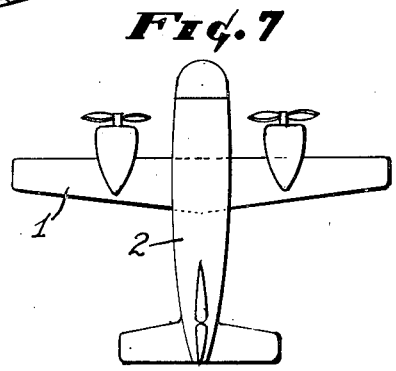
INVENTOR.
M. R. WILEY.
BY U. G. Charles
Atty.

Feb. 15, 1949.  M. R. WILEY  2,461,669
VARIABLE INCIDENCE WING CONTROL FOR AIRCRAFT
Filed July 11, 1944  3 Sheets-Sheet 3
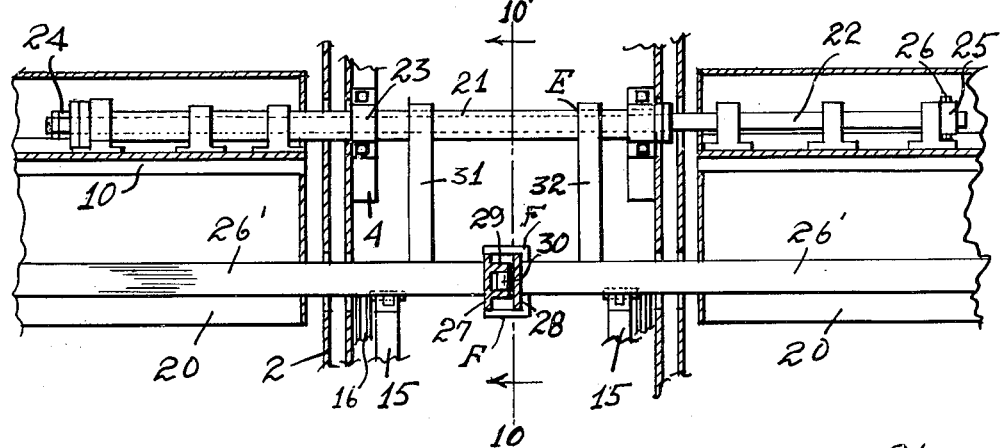
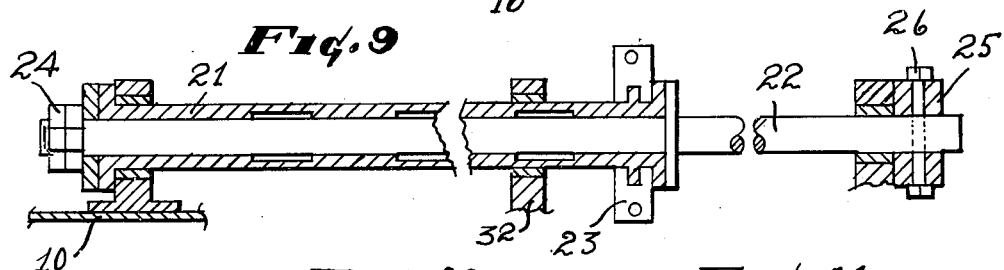
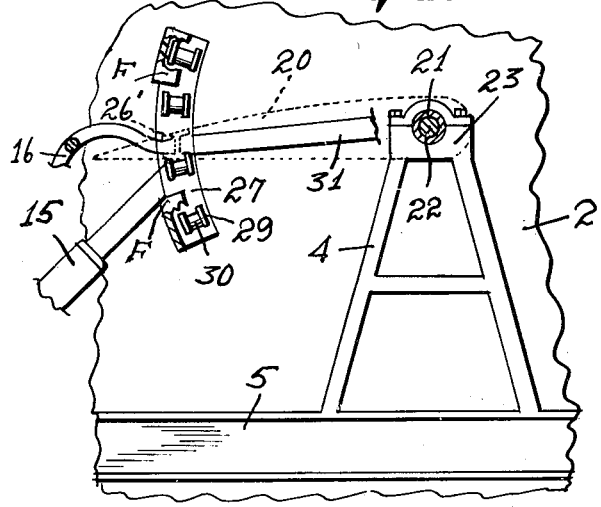
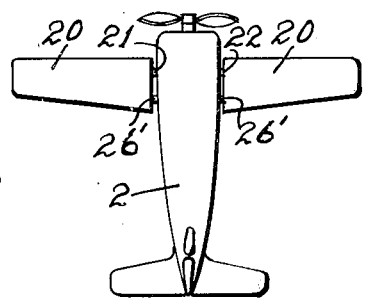
INVENTOR.
M. R. WILEY Patented Feb. 15, 1949

2,461,669

UNITED STATES PATENT OFFICE 2,461,669

VARIABLE INCIDENCE WING CONTROL
FOR AIRCRAFT

Max R. Wiley, Wichita, Kans.

Application July 11, 1944, Serial No. 544,350

3 Claims. (Cl. 244—48)

My invention herein disclosed relates to new and useful improvements in airplane construction and more particularly to the wing arrangement, the principal object of which is to construct the wings from an engineering standpoint wherein one design will extend through the fuselage, and actuating means within the walls of the fuselage to rock the wing and means to resist the rearward thrust imposed upon the wing in its flight; and furthermore a wing element sub-divided with respect to its web or body portion that terminates adjacent the fuselage and extending outward therefrom, the wing elements thus constructed being connected by tubular members telescopically engaging for assembly purpose only but free to rock on each other as actuated to tilt each portion of the wing body separately or simultaneously in the same direction, the result of which is to exercise a mechanical advantage at the movement of take-off or landing of the aircraft, either rocking movement of which may be proportionally counteracted by an elevation rudder to avoid a capsize.

A further object of the invention is to illustrate in the views a system of up-to-date engineering, the most of which I do not claim broadly, and as a summary to introduce briefly the advantages sought to obtain, attention is directed to the following:

The invention consists of means for mounting and moving the wing or wings of an airplane in such a way that the wings may be rotated vertically about an axis perpendicular to the longitudinal axis of the fuselage. In this way the angle of incidence of the wing may be varied or adjusted while the plane is either on the ground or in flight in the air. This device may be used on landplanes, seaplanes, gliders amphibians, or any type of airplane using a wing or wings to provide the lifting force.

Two methods of using this device are shown; one in which the airplane wing is a rigid continuous structural member from tip to tip and the whole wing is rotated as a unit. In the other method shown, the wing is divided or split at the center into two wings, a right and a left wing, which may be controlled or moved either individually or together.

In the case of the rigid wing, the fuselage is lifted and carried by means of one fixed member and one adjustable or moveable member. The fixed member is attached to the front spar or incorporated in the structural framing of the wing near the front spar, while the adjustable member is attached to the rear spar in such a manner that by increasing or decreasing the length of this member the wing will be rotated about the fixed bearing point of the front spar.

In the case of the split wing the two wings are held together by means of two hollow telescoping tubes, one mounted on the spar of each wing, these tubes, one working inside of the other transmitting the tension stresses but still permitting each wing to be rotated independently of the other. The compression stresses at the rear spar are made continuous by attaching an arcuate plate to the inboard end of each rear spar and separating these plates by rollers. In this manner the compressive stresses in the rear spar are transmitted through this break or joint in the rear spar no matter what the relative position of the wings may be.

In both cases in order to relieve the side thrust on the main bearings and to provide greater longitudinal rigidity use is made of a rear thrust bearing consisting of a curved member attached to the rear spar and working on rollers attached to the side framework of the fuselage.

As a brief disclosure of my invention reference will be had to the accompanying drawings, in which like characters will apply to like parts in the different views.

Referring to the drawings:

Fig. 1 is a fragmentary interior elevation of the fuselage to illustrate one style of wing member that passes through the fuselage, and actuating means for the rocking movement of the wing.

Fig. 2 is a transverse view of Fig. 1, but including both side walls of the fuselage in section, said view looking forward of the airplane.

Fig. 3 is an enlarged plan view of the roller guides for the arcuate member of the wing structure taken on line 3—3 in Fig. 2

Fig. 4 is a rear view of Fig. 3.

Fig. 4A is a modification showing the arcuate member engaged between a series of rollers.

Fig. 5 is a cross section through the fuselage to illustrate the bearing of the wing members as illustrated in Fig. 1, said view looking rear of the fuselage.

Fig. 6 is an enlarged detail of one of the wing bearings.

Fig. 7 is a reduced plan view of an airplane to illustrate the wing element passing through the fuselage.

Fig. 8 is an enlarged cross section through a fragmentary portion of the fuselage, showing the wing structure modified.

Fig. 9 is an enlarged longitudinal section through the tubular connecting shaft for the wings to illustrate the telescopic engagement for independent rocking movement of each wing portion external of the fuselage.

Fig. 10 is a sectional view taken on line 10—10 in Fig. 8.

Fig. 11 is a plan view of an aircraft embodying the wing structure to illustrate Figures 8, 9, and 10.

As a more concise description of my invention, attention is directed to Figs. 1, 2, 5, and 7, in which a wing 1 is shown to extend through the side walls of the fuselage 2 and extending each way therefrom at which points suitable openings A are provided for rocking movement of the wing, and the said openings each are provided with a plate 3 secured to the wing and rockable therewith as an enclosure for its respective opening, said plates being external of the side walls and closely fitting thereon with smooth sliding fit.

It will be seen in Figs. 2 and 5 that the wing slants upward each way from its center B, said center point being at the center of the fuselage with respect to a vertical plane. As a means to rockably mount the wing, there is provided a pair of A-frame supports 4, each being adjacent its respective side wall of the fuselage and being seated on a lifting rail 5 that extends longitudinal of the airplane fuselage as carrying means therefor through the medium of the wing. Secured to the upper extremity of the A-frame are bearings 6 in which shaft 7 seats as turning means for said top portions of the frames together and coacting with cross bar 8, the ends of which are secured to the frames a spaced distance downward from said bearings.

Trunnioned in each bearing is a hubbed arm 9, and likewise the hub portions C of said arms are rockably mounted on their respective end portions of said shaft for rocking movement of the wing as the said arms of the hubs are secured to the front spar 10 near the leading edge of the wing.

As a means to avoid friction as a result of end thrust imposed upon shaft 7 during flight of the airplane, there is provided an end thrust ball bearing consisting of a circular flange 11 rigidly secured to the shaft and being in one end of a race 12 embodied in the structure of the bearing while the other end is closed by the rockable arm and between said flange 11 and hub is positioned a plurality of balls 13 to roll should the wing be rocked during an end thrust in either direction longitudinally of the shaft. It will be seen that an outer end portion of the shaft is threaded and having lock nuts 14 to adjustably secure the shaft in the bearings so that the balls will roll freely in their function and furthermore so that the sides of the hubbed arms freely work without friction.

To rock the wing there is provided a pair of actuators 15, oppositely disposed in the fuselage adjacent its side walls and being of a jack screw conventional type, electrically operated, the upper ends of the actuator being rockably connected to spar 15' near the trailing edge of the wing while the lower ends are rockably connected to their respective lifting rails, and their motors D being simultaneously controlled by the pilot of the airplane as stabilizing means for the sidewalls. There is provided arcuate elements 16 adjacent the actuators, the upper ends of which are secured near the said trailing edge spar and rockable therewith while their lower arced portions are guided by rollers 17 that are journalled in ears 18 of bearings that are secured to the frame members 19 of the fuselage walls substantially as shown in Figs. 2, 3, and 4.

In Figs. 8 to 11 inclusive, I have shown the wing structure modified, consisting of two wing bodies 20, each of which extends from its respective side wall of the fuselage outward in straight alignment with each other and being connected by tensile and compression elements, the tensile element being near the leading edge of the wing and consisting of a tubular member 21 and a rod 22 extending through the tube and the tube being journalled in bearings 23 that are secured to similar A-frames heretofore described as rocking bearings for one of the wing body members, while the rod is secured to the other wing body and adapted to turn in the tube as rocking bearing for the other wing body, the rod being secured against longitudinal movement by lock nuts 24 at the outer end of the tube and an apertured nipple 25 at the other end of the rod, said nipple being secured against removal by a bolt 26 extending therethrough diametrically. The compression member consists of a bar 26'; subdivided at its longitudinal center and each portion thereof being secured to and extending through the trailing edge of the wing members to function as spar and rocking means for said wing members simultaneously or separately. Said spar members where they meet have a stabilizing arrangement consisting of two arcuate plates 27 and 28, the flat sides of which confront each other and being secured to their respective ends of said bar, one of said plates having pairs of ears 29 in spaced relation therealong and rollers 30 journalled in the pairs of ears and adapted to engage on the flat face of the other plate when said plates are moved oppositely by rocking movement of the wing members, the said plates being secured against separation by lips F, said lip members extending from plate 27 across the edge of plate 28 and inward on its face thereof as shown in Figs. 8 and 10.

There are also provided stabilizers for the wing members similar to that shown in Figs. 1 and 2 and being positioned in like manner.

To rock said wings, it will be seen that each spar member extends into the fuselage and being connected to the sleeve rigidly by arms 31 and 32, except arm 32 where it joins the sleeve as at E is adapted to permit turning of the sleeve whereby the wing body adjacent thereto may be rocked independently of the other if so desired or vice versa for the other wing body. Each wing is rocked by similar actuators to that shown for the wing in Figs. 1 and 2 but may be separately or simultaneously energized if so desired by the pilot.

It will be understood that the walls of the fuselage have arcuate slots through which the spar members 26' will engage as vertically moved at the time of rocking said wing bodies. The actuator element may be substituted by pneumatically, hydraulically, or other power medium selectively and other modifications may be made as lie within the scope of the appending claims.

Having fully described my invention what I claim as new and desire to secure by Letters Patent is:

1. In airplane construction, a fuselage, a wing body for each side of the fuselage, extending therefrom in straight alignment from each other, a tubular element rotatably carried by the fuselage, said tubular element having an end portion extending a spaced distance into the leading edge of one wing body, means to secure said end portion within said wing body, a rod rotatably positioned in said tubular element and extending outward therefrom at each end thereof, one end portion of said rod extending a spaced distance into the leading edge of the other wing body and means to secure last said end portion therein, means to restrict longitudinal movement of said rod as engaged in the tubular element, a spar element for the trailing edge of each wing body, said spar elements each having an end portion extending through and into the fuselage toward each other, means carried by the end portions of the spar elements to restrict longitudinal movement of the spar elements, said means permitting vertically movement thereof independently, and an actuator secured to each spar element to rock the wing bodies.

2. In airplane construction comprising a fuselage, a tubular element rotatably carried by the fuselage and extending outward therefrom at right angle with respect to the longitudinal axis of the fuselage, a wing body and means to secure the leading edge thereof to the outwardly extending portion of the tubular element, a rod rotatable in said tubular element, one end of said rod extending outward from the fuselage to the side opposite from that of the outwardly extending tubular portion, a wing body having its leading edge carried by the outward extension of the rod and means to secure the same therein, means on the rod to restrict longitudinal movement as carried by the tubular element, a spar element for the trailing edge of each wing body, said spar elements extending into the fuselage, the ends of said spar elements terminating in spaced relation, an arcuate plate secured to each spar element at its inner terminal end, rotating rollers carried by one arcuate plate to engage with the other arcuate plate, means carried by first said arcuate plate to retain the rollers in contact with the second said arcuate plate for vertical movement of said spar elements independently, and an actuator for each spar element to rock the same.

3. In combination with the fuselage of an aircraft, a wing structure comprised of a pair of body members for the wing and being of suitable length and width and spaced apart to receive the body of the fuselage therebetween, said wing body members being aligned with each other and oppositely extending, a tube extending into one of the wing members and aligned therewith longitudinally and being secured adjacent the leading edge of its wing body and extending outward to engage across the fuselage of the aircraft, bearings secured in the fuselage and in which the tube is trunnioned, a rod rigidly secured in the other wing body correspondingly with respect to the tube and adapted to turn in the tube, means to secure the rod and tube against telescopic movement but free to turn oppositely, said tube and rod being secured to their respective wing bodies, a pair of spar elements directed toward each other longitudinally, abutting means on their confronting ends of the spar elements that are adapted to move oppositely without friction to carry their respective spar elements in parallelism, said spar elements for their other end portions extending into their respective wing bodies adjacent their trailing edges and being secured rigidly to rock the same, and a pair of power energized actuators having one of their ends secured to the fuselage, while the other ends are rockably secured to their respective spar elements to rock the same oppositely or in the same direction, while the bodies respond thereto.

MAX R. WILEY.

REFERENCES CITED

The following references are of record in the file of this patent:

UNITED STATES PATENTS

| Number | Name | Date |
|---|---|---|
| 1,435,848 | Huffmaker | Nov. 14, 1922 |
| 2,118,987 | Smith | May 31, 1938 |
| 2,362,224 | Roseland | Nov. 7, 1944 |